United States Patent
Bregar et al.

(10) Patent No.: US 8,426,715 B2
(45) Date of Patent: Apr. 23, 2013

(54) CLIENT-SIDE AUDIO SIGNAL MIXING ON LOW COMPUTATIONAL POWER PLAYER USING BEAT METADATA

(75) Inventors: John Bregar, Seattle, WA (US); Andy Precious, Duvall, WA (US); Sanjeev Mehrotra, Kirkland, WA (US); Serge Smirnov, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 574 days.

(21) Appl. No.: 11/958,331

(22) Filed: Dec. 17, 2007

(65) Prior Publication Data

US 2009/0157203 A1 Jun. 18, 2009

(51) Int. Cl.
  *G10H 1/40* (2006.01)
(52) U.S. Cl.
  USPC .................. 84/612; 84/611; 84/635
(58) Field of Classification Search ........... 84/612
  See application file for complete search history.

(56) References Cited

U.S. PATENT DOCUMENTS

| | | | |
|---|---|---|---|
| 5,792,971 A | 8/1998 | Timis et al. | |
| 5,952,596 A | 9/1999 | Kondo | |
| 6,046,395 A | 4/2000 | Gibson et al. | |
| 6,850,252 B1 | 2/2005 | Hoffberg | |
| 6,940,987 B2 | 9/2005 | Claesson | |
| 6,958,441 B2 | 10/2005 | Georges et al. | |
| 7,026,534 B2 | 4/2006 | Georges et al. | |
| 2002/0045960 A1* | 4/2002 | Phillips et al. | 700/94 |
| 2004/0069123 A1* | 4/2004 | Becker et al. | 84/612 |
| 2005/0071028 A1 | 3/2005 | Yuen et al. | |
| 2005/0175315 A1 | 8/2005 | Ewing | |
| 2005/0235811 A1* | 10/2005 | Dukane | 84/612 |
| 2006/0107822 A1* | 5/2006 | Bowen | 84/612 |
| 2007/0169614 A1* | 7/2007 | Sasaki et al. | 84/612 |

OTHER PUBLICATIONS

"Audition 2.0 Academic Boxed Product," http://www.kl2software.com/view_details.php?ID=3021, printed Jun. 19, 2007, 6 pages.
"Automatic Beat-slicing," Sound on Sound, May 2004, http://www.soundonsound.com/sos/may04/articles/logicnotes.htm?print=yes, 4 pages.

* cited by examiner

*Primary Examiner* — Chirstopher Uhlir
(74) *Attorney, Agent, or Firm* — Klarquist Sparkman, LLP

(57) ABSTRACT

A low computational power digital audio player achieves beat continuous transitioning between digital audio pieces based on beat metadata, which can be generated via offline processing on a higher computational power computer or via background or idle processing on the digital audio player. The digital audio player produces playlists of beat matching compatible songs based on the metadata, or pick lists of songs that are beat matching compatible with a currently playing song. By facilitating selection of songs with beat matching compatible tempos based on metadata, the beat continuous transitions can be achieved without altering the beat tempo of digital audio pieces, or with simple resampling.

19 Claims, 5 Drawing Sheets

Software 580 implementing metadata generation

CLIENT-SIDE AUDIO SIGNAL MIXING ON LOW COMPUTATIONAL POWER PLAYER USING BEAT METADATA

BACKGROUND

With the introduction of portable digital media players, the compact disk for music storage, and audio delivery over the Internet, it is now common to store, buy and distribute music and other audio content in digital audio formats. The digital audio formats empower people to enjoy having hundreds or thousands of music songs available on their personal computers (PCs) or portable media players. This facilitates listening to any desired music in a wide variety of settings.

People like listening to music in dance and workout situations. Custom playlists of songs from different artists, albums and genres are commonly used. Portable players have long been used during individual workout situations. Now that portable media players have capacity to store larger music collections and custom playlists, portable players also are used by instructors in combination with a speaker or amplification system in group situations, such as for workout and dance classes.

In dance and workout situations, it can be desirable to have one song transition smoothly into the next (e.g., without a perceptually significant $0^{th}$ or $1^{st}$ order beat discontinuity). This permits the activity (dance or workout) to continue uninterrupted for longer than the duration of a single song, while allowing a variety in music selection over the course of the activity (such as to provide a mood change or other desired effect). In many dance and workout situations with a live DJ, listeners have now come to expect transitions with beat continuity between songs.

Various techniques are known and in use for seamlessly transitioning between songs. For example, disk jockeys (DJs) can use manual or automated techniques to queue and transition between songs at a dance, or in broadcasting. Software applications also are available on a personal computer that provide various audio recording, mixing, editing and mastering features, and can be used to achieve transitions between music tracks with beat continuity. However, these techniques involve considerable digital analysis and manipulation of the sound recordings. On the other hand, portable digital media players generally have limited computational power. Currently available portable media players with limited computational capacity have lacked the capability to perform song transitions without beat discontinuity.

SUMMARY

The following Detailed Description concerns various techniques and tools that provide a way for a user of a portable personal digital audio player to combine and/or modify audio recordings at playback to create a more entertaining listening experience. More specifically, the techniques and tools provide ways to achieve smooth song transitions (without beat discontinuity) between songs, on a portable playback device with limited computational power.

One main difficulty in making known automated beat matching processes work on a portable device is that proper beat matching requires considerable computational power, which most portable devices lack.

In accordance with a technique described more fully herein, digital analysis of songs that are to be transferred onto a portable music player device is performed off-line, such as by a personal computer involved in the transfer of the songs onto the portable music player or prior to distribution from a publisher. This digital analysis produces metadata concerning the beat or tempo of the songs, or possibly a tempo curve or profile (tempo as a function of time) for songs that contain tempo changes. Other metadata also may be collected, such as the key, genre, length, etc. The metadata can be embedded into the digital audio file of the song itself, or may be saved to a separate file or database that is transferred to the portable player.

The portable player uses the information from the metadata to perform beat matching or other like processing to mix or combine songs at playback. For example, the portable player performs song transitions without beat discontinuities by matching the songs' tempos based on the metadata. The portable player also can provide playlists of songs with tempos suitable for beat matching based on the metadata, or other user interface features for selecting songs from the music library on the portable player that are suitable for beat matching with a currently playing song.

This Summary is provided to introduce a selection of concepts in a simplified form that is further described below in the Detailed Description. This summary is not intended to identify key features or essential features of the claimed subject matter, nor is it intended to be used as an aid in determining the scope of the claimed subject matter. Additional features and advantages of the invention will be made apparent from the following detailed description of embodiments that proceeds with reference to the accompanying drawings.

DETAILED DESCRIPTION

The following detailed description concerns various techniques and tools for digital analysis and manipulation of audio recordings responsive to dynamic features of the content, such as pitch, tempo, beat, lexical information, and other musical or entertainment-related characteristics in a playback (as opposed to what is now regarded as authoring) device. In particular, the techniques and tools can be used to perform transitions without beat discontinuity and other mixing or combinations of songs, music tracks and stems or song parts, on a portable music player. The portable music player leverages off line digital analysis, such as by a personal computer or by a music publisher, to produce various song/track/stem combination effects during a playback or listening session.

The various techniques and tools described herein may be used independently. Some of the techniques and tools may be used in combination. Various techniques are described below with reference to flowcharts of processing acts. The various processing acts shown in the flowcharts may be consolidated into fewer acts or separated into more acts. For the sake of simplicity, the relation of acts shown in a particular flowchart to acts described elsewhere is often not shown. In many cases, the acts in a flowchart can be reordered.

I. Beat Matching Overview

Transitions and other combinations of songs or song stems without beat discontinuity involves beat matching between the songs. We observe that beat matching can be thought of as a combination of several parts:

1. Beat detection. The analysis of music track to determine the rate and phase of its beat pattern, as well as stress phase, time signature and other higher order musical structure.

2. Time (phase) alignment of consecutive songs to maintain $0^{th}$ order beat continuity.

3. Rate alignment of consecutive songs to maintain $1^{st}$ order beat continuity Of these, the third aspect (rate alignment) generally has the highest complexity because it can require up to an entire song to undergo time compression or expansion. However, the requirement for rate alignment has some degree of tolerance. In other words, two songs whose rate do not match exactly can be played in sequence without a perceived beat disturbance so long as their phase is aligned at the junction point (i.e., transition between songs), and their beat rate is close enough (~1-2%). In addition, music that is commonly used in dance and workout scenarios typically has tempos that fit within a fairly narrow range (e.g., 110-140 beats per minute).

II. Digital Analysis for Metadata Production

Figure 1:
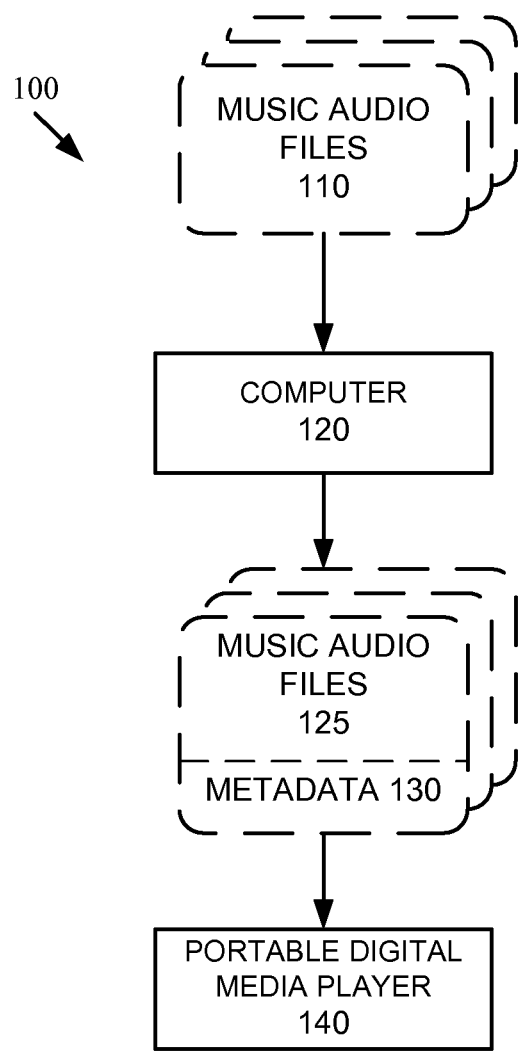
FIG. 1 is a block diagram illustrating the embedding of metadata from off line digital analysis into an audio media file or stream to permit beat matching and other techniques on a low computational power audio player.

With reference to FIG. 1, the manipulation of audio content 125 (e.g., mixing or combining audio tracks and stems without beat discontinuity, etc.) by a portable digital media player and like playback devices with limited computational resources is accomplished using metadata 130 generated via offline processing. More particularly, digital analysis (e.g., beat analysis and like) of music audio files 110 that are to be transferred to a portable digital media player 140 is performed by a separate audio processing device prior to transfer to the portable digital media player. The music audio files can be full music tracks, stems or song parts, and other audio content.

The separate audio processing device that performs this offline processing can be a computer 120 that manages the transfer of the music audio files to the portable digital media player. For example, the computer can be an end user's personal computer (PC) running music library application software that handles the download of music audio files from an Internet retailer, "ripping" (i.e., reading) of the audio files from a compact disk or other recording medium, and transfer of such music audio files to the portable digital media player. The digital analysis can be performed by the music library application or by separate software on the computer 120. The computer also can be a computer or other audio processing hardware operated by a music distributor, retailer, publisher or author of the music audio files.

The metadata 130 can be embedded by the computer 120 into the music audio files 125 themselves, or in separate files or database associated with and transferred onto the portable digital media player with the music audio files. For example, the metadata can be embedded in a portion of the music audio file format reserved for metadata (such as, tags in an MP3, ASF or other audio format file), or in extension regions or other non-audio content layers of the file format.

Figure 2:
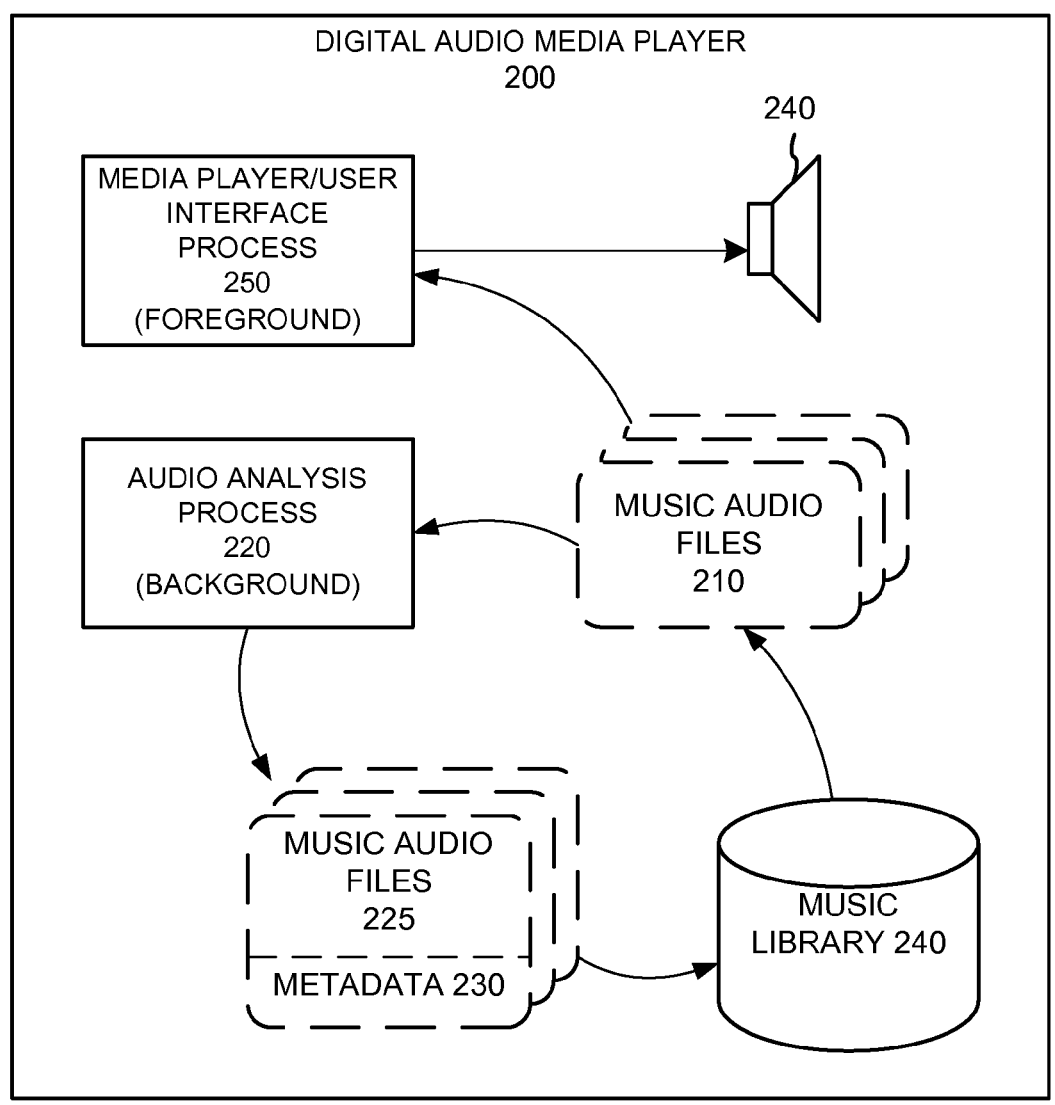
FIG. 2 is a block diagram illustrating the generation of metadata by an audio analysis background process on a digital audio media player.

In an alternative implementation 200 illustrated in FIG. 2, the digital analysis (e.g., beat analysis or like) of music audio files 210 is performed as a background process 220 on the digital audio media player 200 itself. The music audio files 210 are stored in a music library 240 in the player's memory (e.g., a hard drive, non-volatile memory chip, etc.). A foreground process 250 provides user interface and media playing functionality of the device. When playing audio, the process 250 reads music audio files from the music library 240, and produces an audio signal to the player's audio output 240. During idle processing times (such as, when not playing audio), the audio analysis process 220 is run in the background on the digital audio media player's processor to produce metadata 230, which is embedded in the music audio files 225 or stored in association with the music audio files in the music library 240 of the digital audio media player.

In both metadata generation implementations 100, 200, the offline or background process first checks whether beat metadata for the music audio file already exists, and is complete. For implementations where the metadata is embedded in the music audio file itself, this check can be performed by examining the music audio files. In some implementations, beat metadata for music audio files also can be provided via an online repository, in which case this check may include accessing the online metadata repository to check whether the metadata for the respective audio file is available. The metadata for a music audio file can be uniquely indexed by a song identifier or computed song signature. If the metadata is available in the online repository, the offline or background obtains the metadata from the online repository, and embeds the metadata in the music audio files or otherwise stores the metadata in the music library of the digital audio media player. If the metadata does not exist or is incomplete, the offline or background process proceeds with the digital analysis to generate the beat metadata.

Figure 3:
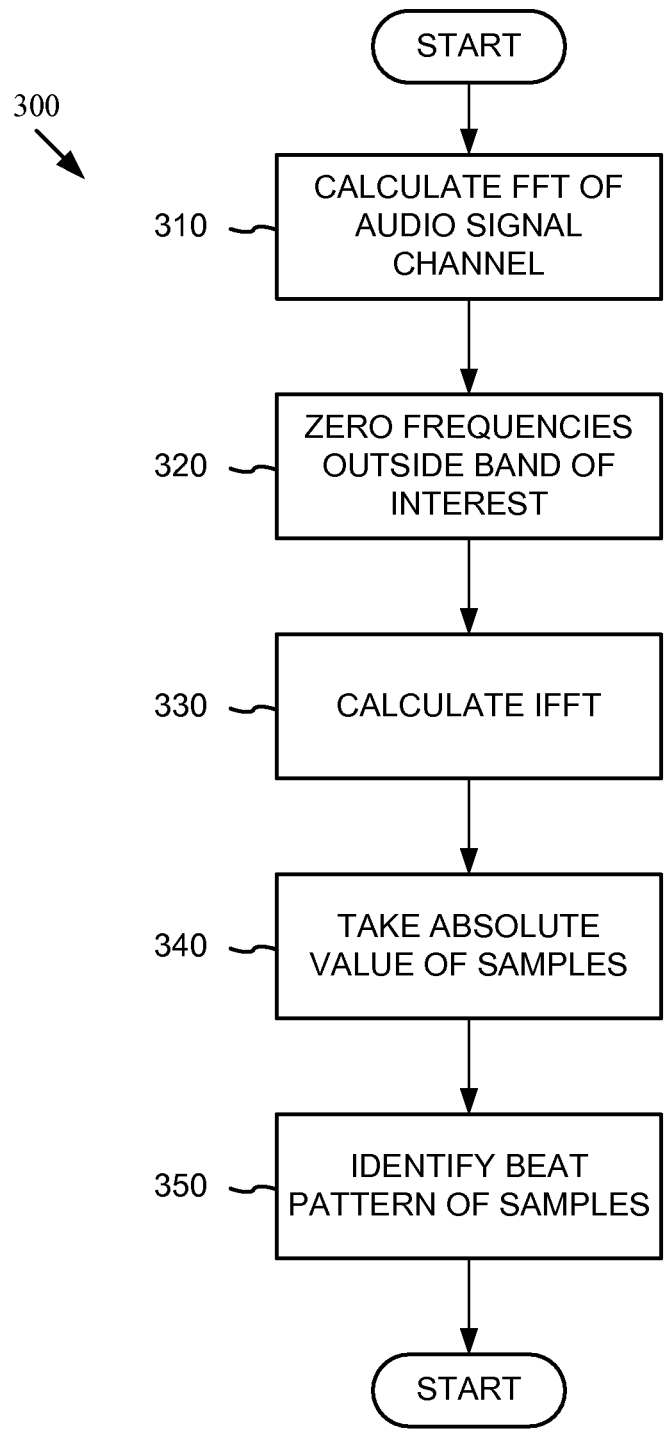
FIG. 3 is a flow diagram of a Hilbert envelope beat detection analysis used for producing beat metadata.

In implementations shown in FIGS. 1 and 2, the digital analysis includes detection of the beat tempo (e.g., the number of beats-per-minute) and phase (time alignment of the beats in the music track). Various known techniques of audio analysis for beat detection can be employed. FIG. 3 illustrates one such audio analysis 300 using the Hilbert envelope for beat detection. The audio analysis 300 starts with calculating 310 a long-period fast-Fourier transform (FFT) for a selected channel of the audio signal. This produces a set of coefficients representative of the power of the audio signal along a spectrum of frequencies. The audio analysis 300 then zeroes 320 the coefficients of frequencies outside of a selected frequency band (including a negative frequency side), which can be chosen to be bass, mid or high frequencies (the choice of frequency band can depend, for example, on the genre of the musical composition). The audio analysis 300 then performs an inverse fast-Fourier transform (IFFT) 330, and takes the absolute value of the resulting samples 340. For most any music, the beat is then readily identifiable from the remaining sample peaks.

In addition to tempo and phase, the audio analysis also can include detecting the stress phase, beat pattern or time signature (e.g., 4/4 time, etc.), or other higher order temporal musical structure (e.g., measure, bar, etc.) of the music audio file. This determination can be made be determining a common fundamental rate shared by all beats, and which beat phase has greater stress or emphasis. Music typically has several readily detectable beats at different frequencies. In danceable music, all beats typically share a common fundamental rate, but some of the beats are harmonics of that rate. The determination of the stress or emphasis phase of the beat can be based in part on the music genre, and further informed by a loudness measure of the music.

After the beat is detected, the audio analysis records metadata including beat information. More specifically, the metadata 130 (FIG. 1), 230 (FIG. 2) contains information defining the beat of the respective music audio file. This beat information includes the tempo (e.g., beats per unit time) and phase (i.e., time alignment of the beat). The beat information can further include the stress phase, beat pattern and higher order temporal musical structure. In compositions containing tempo changes, the metadata information can be a tempo curve (i.e., tempo as a function of time) as opposed to a single tempo value. In addition, the metadata can include information as to key, music genre, artist, length of song, etc. This additional metadata information can be useful to aid the user in selecting songs that are compatible to combine by processing on the player, as discussed further below.

III. Music Sorting by Tempo

Figure 4:
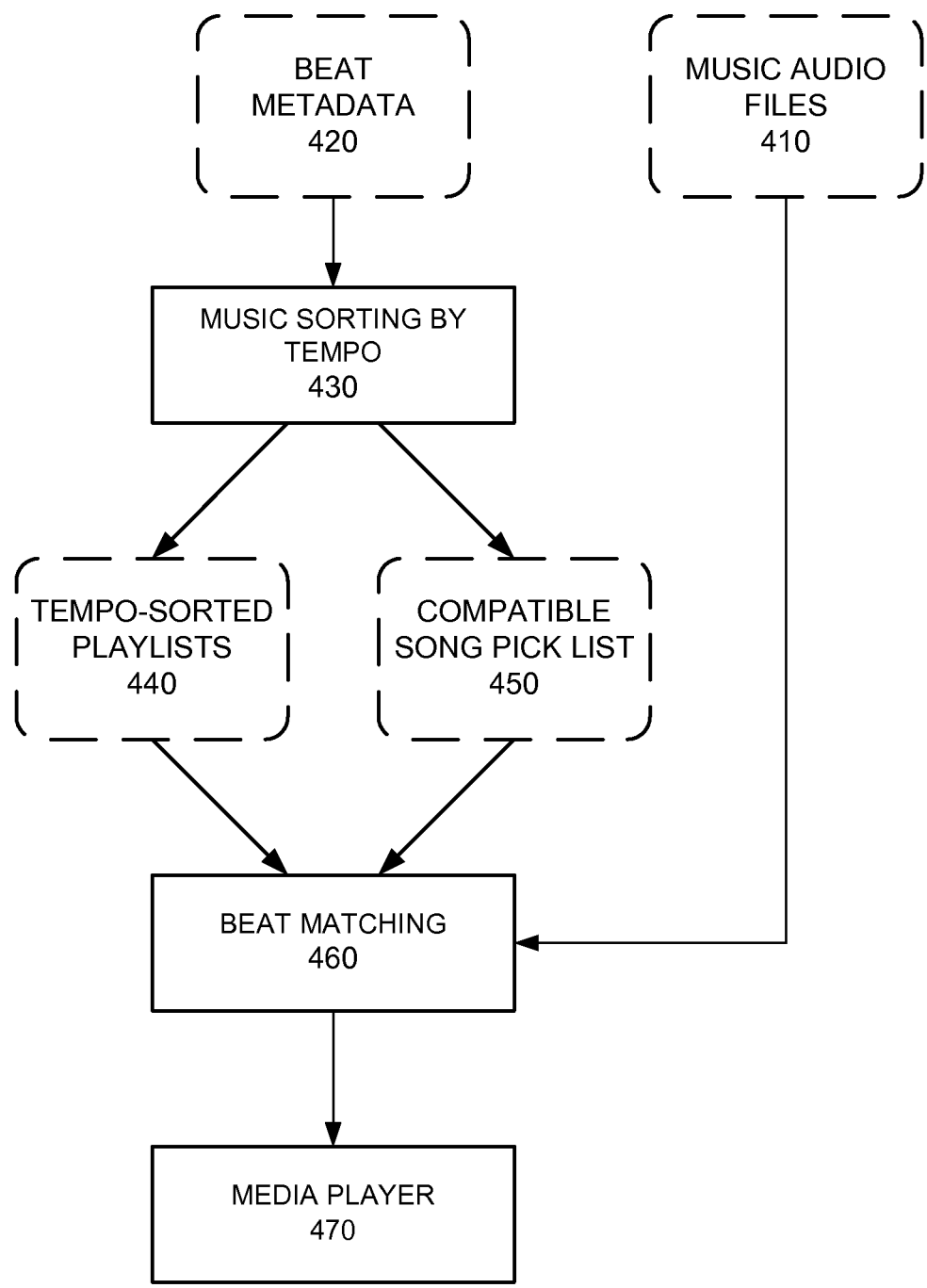
FIG. 4 is a flow diagram of music sorting by tempo based on the beat metadata.

With reference to FIG. 4, the beat metadata 410 (that was produced via offline processing on a computer as shown in FIG. 1, or via background processing illustrated in FIG. 2) is used on the media player 200 to assist in creating beat-continuous transitions between songs. As noted above, transitions without a perceived best disturbance can be made between songs that are sufficiently close in tempo by simple time alignment of their beats, without having to perform computationally expensive rate- and pitch-shifting of the songs.

The media player includes music sorting by tempo 430 to provide the beat-continuous song transitions. In one implementation, the media player automatically sorts songs from a large music library into one or more playlists 440 of beat matchable songs (i.e., songs whose tempos are within an acceptable range for beat matching with rate/pitch shifting, such as within a ~1-2% tempo tolerance threshold). The user is then able to choose to play the songs in such a playlist 440 with continuous transitions.

In another implementation of the music sorting by tempo 430 feature, the media player arranges the songs from a user configured playlist in a sequence such that the tempo change between successive songs does not exceed the acceptable threshold, if possible. For example, the music sorting 430 can arrange the songs in order of ascending or descending tempo.

In a further implementation of the music sorting by tempo 430 feature, the media player provides a pick list 450 of songs out of the music library (or a currently playing playlist) whose tempos are within the acceptable range for beat matching to a currently playing song. When the user selects this feature, the media player presents this pick list in its user interface for the user to further choose a next song to be played from the pick list 430 of beat matching compatible songs. Additionally, the media player can provide an indication for each song on the pick list of the number of songs available from the music library (or a currently playing playlist) that would be within the acceptable tempo range of the respective pick list song for subsequent selection with the feature (i.e., for play as the song after next).

In yet another implementation of the music sorting by tempo 430 feature, the media player can offer a picklist of songs whose beat would be in stark contrast to the beat of the current song. This would provide a song choice for an intentional mood change effect.

In some implementations of the music sorting by tempo 430 feature, the music player can employ a second acceptable tempo tolerance threshold for songs that can be beat-rate-matched via simple resampling (allowing some degree of pitch shifting). If pitch matching is not considered necessary, this second threshold can be arbitrarily large. This second threshold is employed to find further songs for the playlist, sequence order, or pick list, when no further songs meet the first tempo tolerance threshold.

In addition to beat phase and tempo, the music sorting 430 can further consider other information in the metadata for determining beat compatibility, such as the key, time signature, stress phase, higher order musical structure, genre or other metadata information.

Based on the song sequence selected via the music sorting by tempo 430 features, the media player performs beat matching 460 to create a transition between the selected songs 410 without beat discontinuity. If the tempos of successive songs is within the first tempo tolerance threshold, the beat matching is performed by simple time alignment of the songs' beats based on the beat metadata 420. The time alignment can include aligning the stress phase, and/or other higher order musical structure. This can be accompanied by fading from one song to the other over a short interval, or immediate splicing at the beat juncture from one song to the next.

On the other hand, where the tempos of successive songs selected with the music sorting by tempo feature is over the first tempo tolerance but within the second tempo tolerance, the media player performs beat matching 460 using both time alignment and rate matching (e.g., using simple resampling) between the two songs.

The media player can automatically select a transition point (beat juncture) at which to make the beat-matching transition to the next song based on a signal complexity measurement. Music compositions often have segments of low signal complexity (e.g., in terms of the number of instruments playing). Such segments can be selected to reduce the processing power needed to detect the phase of beats (e.g., by audio analysis process 220 in FIG. 2). Further, transitions made at such lower complexity segments tend to sound more natural than those made at complex segments.

IV. Computing Environment

Figure 5:
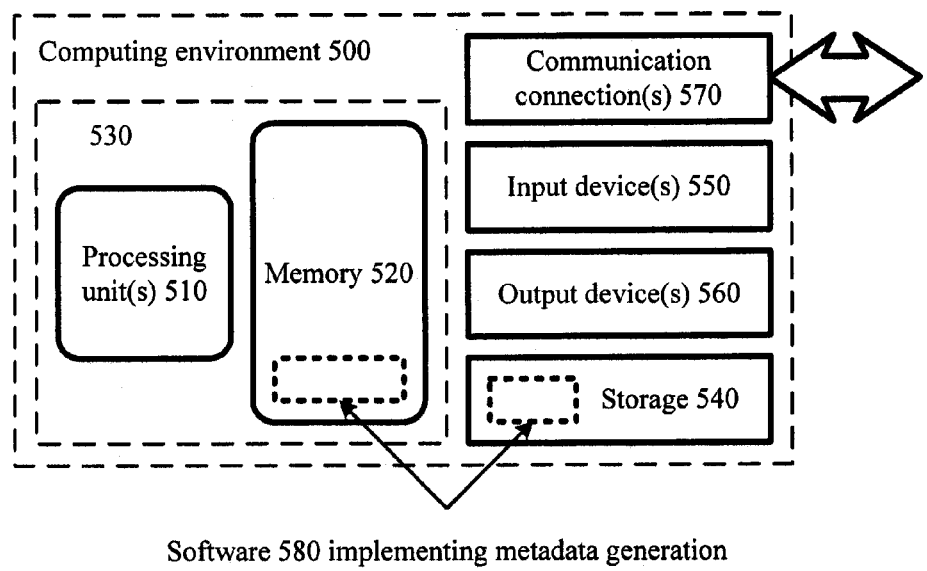
FIG. 5 is a block diagram of a generalized operating environment in conjunction with which various described embodiments may be implemented.

As discussed above with reference to FIG. 1, the beat metadata generation can be performed using a computer, such as a server, personal computer, laptop or the like. FIG. 5 illustrates a generalized example of a suitable computing environment 500 in which beat metadata generation may be implemented. The computing environment 500 is not intended to suggest any limitation as to scope of use or functionality, as described embodiments may be implemented in diverse general-purpose or special-purpose computing environments.

With reference to FIG. 5, the computing environment 500 includes at least one processing unit 510 and memory 520. In FIG. 5, this most basic configuration 530 is included within a dashed line. The processing unit 510 executes computer-executable instructions and may be a real or a virtual processor. In a multi-processing system, multiple processing units execute computer-executable instructions to increase processing power. The processing unit also can comprise a central processing unit and co-processors, and/or dedicated or special purpose processing units (e.g., an audio processor). The memory 520 may be volatile memory (e.g., registers, cache, RAM), non-volatile memory (e.g., ROM, EEPROM, flash memory), or some combination of the two. The memory 520 stores software 580 implementing one or more audio processing techniques and/or systems according to one or more of the described embodiments.

A computing environment may have additional features. For example, the computing environment 500 includes storage 540, one or more input devices 550, one or more output devices 560, and one or more communication connections 570. An interconnection mechanism (not shown) such as a bus, controller, or network interconnects the components of the computing environment 500. Typically, operating system software (not shown) provides an operating environment for software executing in the computing environment 500 and coordinates activities of the components of the computing environment 500.

The storage 540 may be removable or non-removable, and includes magnetic disks, magnetic tapes or cassettes, CDs, DVDs, or any other medium which can be used to store information and which can be accessed within the computing environment 500. The storage 540 stores instructions for the software 580.

The input device(s) 550 may be a touch input device such as a keyboard, mouse, pen, touchscreen or trackball, a voice input device, a scanning device, or another device that provides input to the computing environment 500. For audio or video, the input device(s) 550 may be a microphone, sound card, video card, TV tuner card, or similar device that accepts audio or video input in analog or digital form, or a CD or DVD that reads audio or video samples into the computing environment. The output device(s) 560 may be a display, printer, speaker, CD/DVD-writer, network adapter, or another device that provides output from the computing environment 500.

The communication connection(s) 570 enable communication over a communication medium to one or more other computing entities. The communication medium conveys information such as computer-executable instructions, audio or video information, or other data in a data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Embodiments can be described in the general context of computer-readable media. Computer-readable media are any available media that can be accessed within a computing environment. By way of example, and not limitation, with the computing environment 500, computer-readable media include memory 520, storage 540, and combinations of any of the above.

Embodiments can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular data types. The functionality of the program modules may be combined or split between program modules as desired in various embodiments. Computer-executable instructions for program modules may be executed within a local or distributed computing environment.

For the sake of presentation, the detailed description uses terms like "determine," "receive," and "perform" to describe computer operations in a computing environment. These terms are high-level abstractions for operations performed by a computer, and should not be confused with acts performed by a human being. The actual computer operations corresponding to these terms vary depending on implementation.

In view of the many possible embodiments to which the principles of our invention may be applied, we claim as our invention all such embodiments as may come within the scope and spirit of the following claims and equivalents thereto.

We claim:

1. A method of combining audio tracks on a digital audio media player device, the method comprising:

performing digital analysis of digital audio media content for beat detection for at least two pieces of digital media content, wherein performing the digital analysis of digital audio media content for beat detection for the at least two pieces of digital media content comprises determining stress phases at least based on a music genre and a loudness measure;

producing metadata for the digital audio media content containing information as to beat tempo and phase of the digital audio media content, the metadata comprising a tempo curve representing beat tempo for the digital audio media content pieces as a function of time; and utilizing the beat tempo and phase information from the metadata and using the digital audio media player device for playing digital audio media, playing a combination of the at least two pieces of the digital audio media content on the digital audio media player device, wherein playing the combination of the at least two pieces of the digital audio media content on the digital audio media player device comprises aligning of stress phase of the beats of the at least two pieces of the digital audio media content;

wherein utilizing the beat tempo and phase information from the metadata comprises selecting songs having beat matching compatibility from a music library on the digital audio media player device based on a first tempo tolerance threshold that permits beat matching comprising phase alignment at a junction point and rate alignment of the songs without altering beat tempo of the songs.

2. The method of claim 1 wherein playing the combination of the at least two pieces of the digital audio media content comprises performing beat rate and time alignment of the at least two pieces of digital audio media content to transition with beat continuity between playing first and second of the at least two pieces of digital media audio content.

3. The method of claim 1 wherein utilizing the beat tempo and phase information from the metadata comprises sorting songs in a playlist by tempo, and wherein the first tempo tolerance threshold being within one to two percent.

4. The method of claim 1 wherein utilizing the beat tempo and phase information from the metadata comprises producing a playlist of the songs selected having beat matching compatibility from a music library on the digital audio media player device.

5. The method of claim 4 wherein producing the playlist comprises:

finding no song in the music library that is beat matching compatible with a predecessor song available in the playlist within the first tempo tolerance threshold, selecting a next song from the music library that is beat matching compatible with the predecessor song in the playlist within a second tempo tolerance threshold permitting beat matching using resampling.

6. The method of claim 1 wherein utilizing the beat tempo and phase information from the metadata comprises producing a pick list of songs that have beat matching compatibility with a currently playing song from the music library on the digital audio media player device for user selection of a next song to play after the current song with a beat continuous transition from the currently playing song.

7. The method of claim 6 wherein utilizing the beat tempo and phase information from the metadata further comprises, for each song on the pick list, providing an indication of a number of songs that have beat matching compatibility with the respective pick list song from the music library on the digital audio media player device.

8. The method of claim 1 wherein the metadata further comprises information as to a genre of a piece of digital audio media content.

9. A portable digital audio media player device featuring beat continuous transitions between consecutively played pieces of digital audio media content using low computational power, the portable digital audio media player device comprising:
   memory for storing a music library containing a plurality of pieces of digital audio media content and metadata comprising information of beat tempo and phase of the digital audio media content pieces, the information of beat tempo comprising a tempo curve representing beat tempo as a function of time; and
   memory comprising computer-executable instructions when executed causing the digital audio media player device to perform a method, the method comprising:
   selecting a sequence of at least two digital audio media content pieces from the music library that are beat matching compatible based on the metadata and a first tempo tolerance threshold permitting beat matching comprising phase alignment at a transition and rate alignment of the at least two digital audio media content pieces without altering beat tempo of the at least two digital audio media content pieces; and playing the sequence of the at least two digital audio media content pieces with a beat continuous transition between successive pieces of the sequence; and
   performing a digital analysis for beat detection at least by determining stress phases for the at least two digital audio media content pieces at least based on one or more music genres and one or more loudness measures; and
   wherein playing the sequence of the at least two digital audio media content pieces comprises aligning the stress phases of the at least two digital audio media content pieces.

10. The portable digital audio media player device of claim 9 where selecting the sequence comprises sorting a playlist comprising a subset of the digital audio media content pieces by tempo based on the metadata, and wherein the first tempo tolerance threshold being within one to two percent.

11. The portable digital audio media player device of claim 9 where selecting the sequence comprises producing a playlist having a plurality of digital audio media content pieces from the music library that are within a tempo tolerance threshold based on the metadata.

12. The portable digital audio media player device of claim 11 where producing the playlist further comprises finding no pieces in the music library that are within the first tempo tolerance, selecting digital audio media content pieces from the music library based on the metadata that are within a second tempo tolerance threshold permitting beat matching using simple resampling.

13. The portable digital audio media player device of claim 11 where selecting the sequence comprises producing a pick list of digital audio content pieces from the music library based on the metadata that are beat matching compatible with a currently playing digital audio content piece.

14. The portable digital audio media player device of claim 13 wherein the pick list further comprises an indication for each listed digital audio content piece of a number of further digital audio content pieces from the music library based on the metadata that are beat matching compatible with the respective listed digital audio content piece.

15. A method of consecutively playing pieces of digital audio media content with beat continuous transitions on a portable digital audio media player device, the method comprising:
   obtaining metadata of a plurality of pieces of digital audio media content repository, wherein the metadata is based on digital analysis of the plurality of pieces of digital audio media content, the digital analysis comprising calculating a long-period Fast-Fourier transform, and determining stress phases at least based on a music genre and a loudness measure;
   storing a music library containing the plurality of pieces of digital audio media content and the metadata comprising information of beat tempo and phase of the digital audio media content pieces comprising the stress phases for the digital audio media content pieces and tempo curves representing beat tempo for the digital audio media content pieces as a function of time;
   selecting a sequence of at least two digital audio media content pieces from the music library that are beat matching compatible based on the metadata; and
   playing the sequence of at least two digital audio media content pieces with a beat continuous transition between successive pieces of the sequence, wherein the beat continuous transition comprises:
   selecting a beat juncture for beat matching based on a signal complexity measurement; and
   performing a time alignment, including aligning of the stress phase, of the beats of the at least two digital audio media content pieces.

16. The method of claim 15 wherein said selecting the sequence comprises producing a playlist of at least two digital audio media content pieces from the music library within a tempo tolerance threshold sorted by ascending or descending tempo based on the metadata.

17. The method of claim 15 wherein said selecting the sequence comprises producing a pick list of digital audio content pieces from the music library based on the metadata that are beat matching compatible with a currently playing digital audio content piece, wherein the pick list further comprises an indication for each listed digital audio content piece of a number of further digital audio content pieces from the music library based on the metadata that are beat matching compatible with the respective listed digital audio content piece.

18. The method of claim 1, wherein utilizing the beat tempo and phase information from the metadata comprises producing a playlist of songs within the first tempo tolerance threshold sorted based on ascending or descending tempo, the songs of the playlist of songs selected from the music library on the digital audio media player device.

19. A method of combining audio tracks on a digital audio media player device, the method comprising:
   performing digital analysis of digital audio media content for beat detection for at least two pieces of digital media content, wherein performing the digital analysis of digital audio media content for beat detection for the at least two pieces of digital media content comprises determining stress phases at least based on a music genre and a loudness measure;
   producing metadata for the digital audio media content containing information as to beat tempo and phase of the digital audio media content, the metadata comprising a tempo curve representing beat tempo for the digital audio media content pieces as a function of time; and
   utilizing the beat tempo and phase information from the metadata and using the digital audio media player device for playing digital audio media, playing a combination of the at least two pieces of the digital audio media content on the digital audio media player device, wherein playing the combination of the at least two pieces of the digital audio media content on the digital audio media player device comprises aligning of stress phase of the beats of the at least two pieces of the digital audio media content;

wherein utilizing the beat tempo and phase information from the metadata comprises selecting songs having beat matching compatibility from a music library on the digital audio media player device based on a first tempo tolerance threshold that permits beat matching of the songs without altering beat tempo of the songs.

* * * * *